US012619080B2

(12) United States Patent
Dhandhania et al.

(10) Patent No.: US 12,619,080 B2
(45) Date of Patent: May 5, 2026

(54) ELECTRONIC DEVICES WITH LIGHT-BLOCKING FABRICS

(71) Applicant: Apple Inc., Cupertino, CA (US)

(72) Inventors: Vedant A Dhandhania, San Jose, CA (US); Edward W Wong, San Jose, CA (US); Yi Zou, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 284 days.

(21) Appl. No.: 18/488,690

(22) Filed: Oct. 17, 2023

(65) Prior Publication Data

US 2024/0168295 A1 May 23, 2024

Related U.S. Application Data

(60) Provisional application No. 63/426,262, filed on Nov. 17, 2022.

(51) Int. Cl.
*G02B 27/01* (2006.01)
*G02B 5/00* (2006.01)

(52) U.S. Cl.
CPC ......... *G02B 27/0172* (2013.01); *G02B 5/003* (2013.01); *G02B 27/0176* (2013.01); *G02B 2027/0169* (2013.01); *G02B 2027/0192* (2013.01)

(58) Field of Classification Search
CPC .............. G02B 27/0172; G02B 5/003; G02B 27/0176; G02B 2027/0169; G02B 2027/0192
USPC ......................................................... 348/53
See application file for complete search history.

(56) References Cited

U.S. PATENT DOCUMENTS

| | | | |
|---|---|---|---|
| 5,385,036 A | 1/1995 | Spillane et al. | |
| 10,470,512 B1 * | 11/2019 | Yee | G02B 7/002 |
| 10,739,600 B1 * | 8/2020 | Yee | G02B 27/0176 |
| 11,441,250 B2 | 9/2022 | Jiang et al. | |
| 2006/0029759 A1 * | 2/2006 | Hannigan | B64D 25/14 |
| | | | 428/36.1 |
| 2013/0229712 A1 * | 9/2013 | Kress | G02B 5/1861 |
| | | | 359/572 |
| 2015/0234108 A1 * | 8/2015 | Harley, Jr. | G06F 1/1669 |
| | | | 362/606 |
| 2017/0108697 A1 * | 4/2017 | El-Ghoroury | G02B 27/0081 |

(Continued)

FOREIGN PATENT DOCUMENTS

| | | |
|---|---|---|
| CN | 105369466 B | 7/2017 |
| CN | 111501190 A | 8/2020 |

*Primary Examiner* — Matthew David Kim
(74) *Attorney, Agent, or Firm* — Treyz Law Group, P.C.; Kendall P. Woodruff

(57) ABSTRACT

A head-mounted device may include a housing with a display that displays images that are viewable from an eye box. A light seal may be coupled the housing and may block outside light from reaching the eye box. The light seal may include a seamless tube of knit fabric that forms an outermost layer of the light seal. A light-blocking fabric may line the inner surface of the seamless tube of knit fabric. The light-blocking fabric may include a dark-colored weft knit layer facing the eye box, a light-colored weft knit layer facing and matching a color of the seamless tube of knit fabric, and a middle layer joining the light-colored weft knit layer and the dark-colored weft knit layer. The dark-colored weft knit layer may ensure sufficient opacity without being visible through the seamless tube of knit fabric.

20 Claims, 8 Drawing Sheets

(56)          References Cited

U.S. PATENT DOCUMENTS

| | | | | |
|---|---|---|---|---|
| 2019/0045962 | A1* | 2/2019 | Baines | B32B 27/08 |
| 2019/0231021 | A1* | 8/2019 | Hoying | A43D 21/00 |
| 2019/0263988 | A1* | 8/2019 | Nair | C09D 7/69 |
| 2019/0349506 | A1* | 11/2019 | Zhang | G06F 3/011 |
| 2020/0172690 | A1* | 6/2020 | Nair | C08J 9/32 |
| 2020/0203324 | A1* | 6/2020 | Shin | G02B 27/0172 |
| 2020/0216684 | A1* | 7/2020 | Nair | C09D 7/70 |
| 2021/0173474 | A1* | 6/2021 | Sztuk | G06F 3/013 |
| 2021/0325631 | A1* | 10/2021 | Tao | G02B 25/001 |
| 2022/0137408 | A1* | 5/2022 | Bohn | G02B 27/4205 |
| | | | | 345/8 |
| 2022/0300073 | A1* | 9/2022 | Reshidko | G06V 40/19 |
| 2022/0365596 | A1* | 11/2022 | Mattila | G02B 6/00 |
| 2023/0078969 | A1 | 3/2023 | Podhajny et al. | |
| 2023/0310718 | A1* | 10/2023 | Davison | A61L 27/507 |
| | | | | 424/424 |
| 2023/0350213 | A1* | 11/2023 | Knoppert | A61F 9/02 |

* cited by examiner

ELECTRONIC DEVICE

CONTROL CIRCUITRY — 20

COMMUNICATIONS CIRCUITRY — 22

INPUT-OUTPUT DEVICES — 24

SENSORS — 16

DISPLAY(S) — 14

OTHER — 18

10

ELECTRONIC DEVICES WITH LIGHT-BLOCKING FABRICS

This application claims the benefit of provisional patent application No. 63/426,262, filed Nov. 17, 2022, which is hereby incorporated by reference herein in its entirety.

FIELD

This relates generally to fabric and, more particularly, to fabric for wearable electronic devices such as head-mounted devices.

BACKGROUND

Electronic devices such as head-mounted devices are configured to be worn on a head of a user. A head-mounted device may have left and right optical systems for presenting images to a user's left and right eyes. The optical systems may be mounted in a head-mounted housing. Conventional head-mounted devices can be uncomfortable and cumbersome to wear or may not provide a satisfactory viewing experience.

SUMMARY

A head-mounted device may include a main housing portion with displays that display images and optical modules through which the images are viewable from eye boxes. A light seal (sometimes referred to as a face frame) may be coupled to the main housing portion and may surround the eye boxes to prevent outside light from reaching the viewing area of the head-mounted device.

The light seal may include inner and outer fabric layers, a face portion that rests against the user's face, and a nose bridge portion that accommodates the user's nose. The outer fabric layer may be a seamless tube of knit fabric that forms an outermost layer of the light seal. The inner fabric layer may be a light-blocking fabric that lines the inner surface of the seamless tube of knit fabric.

The light-blocking fabric may include a dark-colored weft knit layer facing the eye box, a light-colored weft knit layer facing the seamless tube of knit fabric, and a middle layer joining the light-colored weft knit layer and the dark-colored weft knit layer. The light-colored weft knit layer may match a color of the seamless tube of knit fabric. The dark-colored weft knit layer may ensure sufficient opacity without being visible through the seamless tube of knit fabric.

DETAILED DESCRIPTION

An electronic device such as a head-mounted device may have a front face that faces away from a user's head and may have an opposing rear face that faces the user's head. The head-mounted device may include a main housing portion with displays that display images and optical modules through which the images are viewable from eye boxes. A face frame that is coupled to the main housing portion may form a light seal around the eye boxes. The light seal may include inner and outer fabric layers, a face portion that rests against the user's face, and a nose bridge portion that accommodates the user's nose. The outer fabric layer may be a seamless tube of knit fabric that forms an outermost layer of the light seal. The inner fabric layer may be a light-blocking fabric that lines the inner surface of the seamless tube of knit fabric.

The light-blocking fabric may include a dark-colored weft knit layer facing the eye box, a light-colored weft knit layer facing the seamless tube of knit fabric, and a middle layer joining the light-colored weft knit layer and the dark-colored weft knit layer. The light-colored weft knit layer may match a color of the seamless tube of knit fabric. The dark-colored weft knit layer may ensure sufficient opacity without being visible through the seamless tube of knit fabric.

Figure 1:
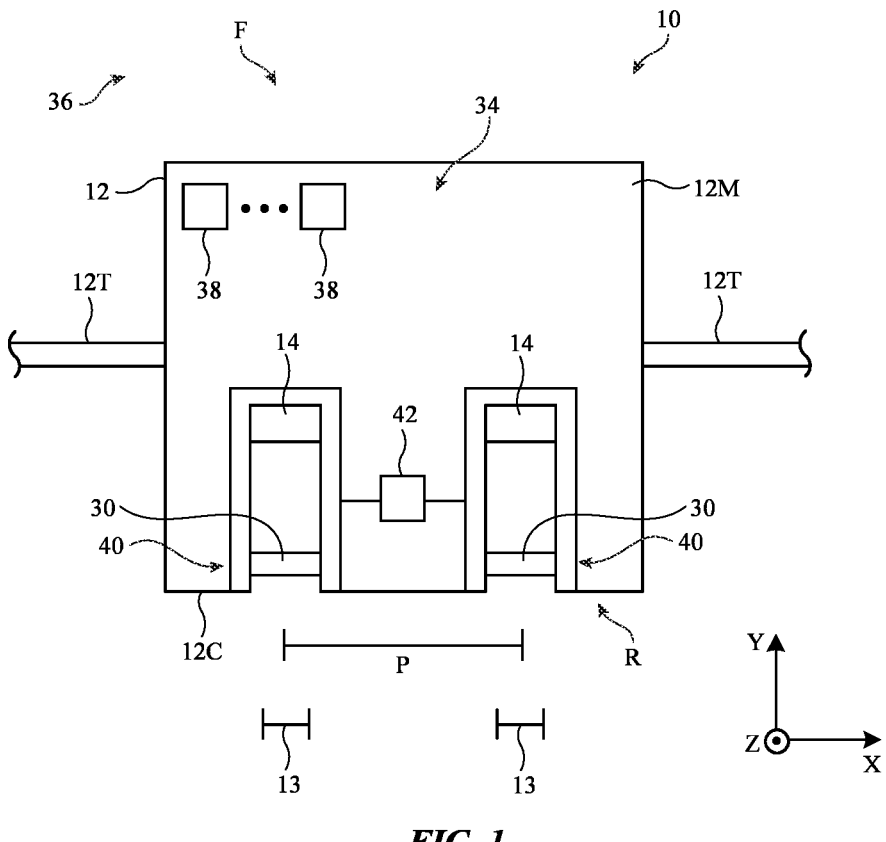
FIG. 1 is a top view of an illustrative head-mounted device in accordance with an embodiment.

A top view of an illustrative head-mounted device that may include a fabric light seal is shown in FIG. 1. As shown in FIG. 1, head-mounted devices such as electronic device 10 may have head-mounted support structures such as housing 12. Housing 12 may include portions (e.g., support structures 12T) to allow device 10 to be worn on a user's head. Support structures 12T (sometimes referred to as temple housing structures or temple housing portions) may be formed from fabric, polymer, metal, and/or other material. Support structures 12T may form a strap or other head-mounted support structures that help support device 10 on a user's head. Some or all of temple housing portions 12T may overlap a user's temples when device 10 is worn on the user's head. A main support structure (e.g., main housing portion 12M) of housing 12 may support electronic components such as displays 14. Main housing portion 12M may include housing structures formed from metal, polymer, glass, ceramic, and/or other material. For example, housing portion 12M may have housing walls on front face F and housing walls on adjacent top, bottom, left, and right side faces that are formed from rigid polymer or other rigid support structures and these rigid walls may optionally be covered with electrical components, fabric, leather, or other soft materials, etc. The walls of housing portion 12M may enclose internal components 38 in interior region 34 of device 10 and may separate interior region 34 from the environment surrounding device 10 (exterior region 36). Internal components 38 may include integrated circuits, actuators, batteries, sensors, and/or other circuits and structures for device 10. Housing 12 may be configured to be worn on a head of a user and may form glasses, a hat, a helmet, goggles, and/or other head-mounted device. Configurations in which housing 12 forms goggles may sometimes be described herein as an example.

Front face F of housing 12 may face outwardly away from a user's head and face. Opposing rear face R of housing 12 may face the user. Portions of housing 12 (e.g., portions of main housing 12M) on rear face R may form a cover such as curtain 12C. In an illustrative configuration, curtain 12C includes a fabric layer that separates interior region 34 from the exterior region to the rear of device 10. Other structures may be used in forming curtain 12C, if desired. The presence of curtain 12C on rear face R may help hide internal housing structures, internal components 38, and other structures in interior region 34 from view by a user.

Device 10 may have left and right optical modules 40. Each optical module may include a respective display 14, lens 30, and support structure 32. Support structures 32, which may sometimes be referred to as lens barrels or optical module support structures, may include hollow cylindrical structures with open ends or other supporting structures to house displays 14 and lenses 30. Support structures 32 may, for example, include a left lens barrel that supports a left display 14 and left lens 30 and a right lens barrel that supports a right display 14 and right lens 30. Displays 14 may include arrays of pixels or other display devices to produce images. Displays 14 may, for example, include organic light-emitting diode pixels formed on substrates with thin-film circuitry and/or formed on semiconductor substrates, pixels formed from crystalline semiconductor dies, liquid crystal display pixels, scanning display devices, and/or other display devices for producing images. Lenses 30 may include one or more lens elements for providing image light from displays 14 to respective eyes boxes 13. Lenses may be implemented using refractive glass lens elements, using mirror lens structures (catadioptric lenses), using holographic lenses, and/or other lens systems. When a user's eyes are located in eye boxes 13, displays (display panels) 14 operate together to form a display for device 10 (e.g., the images provided by respective left and right optical modules 40 may be viewed by the user's eyes in eye boxes 13 so that a stereoscopic image is created for the user). The left image from the left optical module fuses with the right image from a right optical module while the display is viewed by the user.

Not all users have the same interpupillary distance P. To provide device 10 with the ability to adjust the interpupillary spacing between modules 40 along lateral dimension X and thereby adjust the spacing P between eye boxes 13 to accommodate different user interpupillary distances, device 10 may be provided with one or more actuators 42. Actuators 42 can be manually controlled and/or computer-controlled actuators (e.g., computer-controlled motors) for moving support structures 32 relative to each other.

Figures 2, 3:
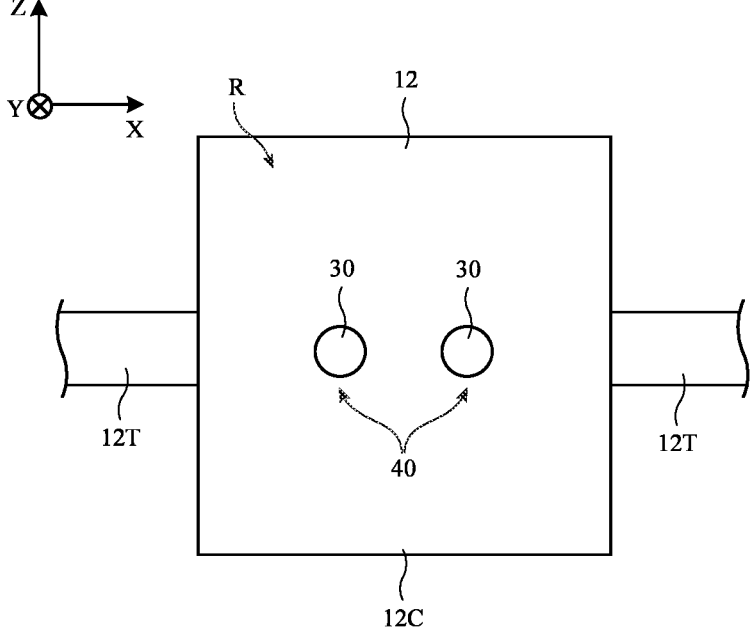
FIG. 2 is a rear view of an illustrative head-mounted device in accordance with an embodiment.
FIG. 3 is a schematic diagram of an illustrative head-mounted device in accordance with an embodiment.

As shown in FIG. 2, curtain 12C may cover rear face F while leaving lenses 30 of optical modules 40 uncovered (e.g., curtain 12C may have openings that are aligned with and receive modules 40). As modules 40 are moved relative to each other along dimension X to accommodate different interpupillary distances for different users, modules 40 move relative to fixed housing structures such as the walls of main portion 12M and move relative to each other. To prevent undesired wrinkling and buckling of curtain 12C as optical modules 40 are moved relative to rigid portions of housing 12M and relative to each other, a fabric layer or other cover layer in curtain 12C may be configured to slide, stretch, open/close, and/or otherwise adjust to accommodate optical module movement.

A schematic diagram of an illustrative electronic device such as a head-mounted device or other wearable device is shown in FIG. 3. Device 10 of FIG. 3 may be operated as a stand-alone device and/or the resources of device 10 may be used to communicate with external electronic equipment. As an example, communications circuitry in device 10 may be used to transmit user input information, sensor information, and/or other information to external electronic devices (e.g., wirelessly or via wired connections). Each of these external devices may include components of the type shown by device 10 of FIG. 3.

As shown in FIG. 3, a head-mounted device such as device 10 may include control circuitry 20. Control circuitry 20 may include storage and processing circuitry for supporting the operation of device 10. The storage and processing circuitry may include storage such as nonvolatile memory (e.g., flash memory or other electrically-programmable-read-only memory configured to form a solid state drive), volatile memory (e.g., static or dynamic random-access-memory), etc. Processing circuitry in control circuitry 20 may be used to gather input from sensors and other input devices and may be used to control output devices. The processing circuitry may be based on one or more microprocessors, microcontrollers, digital signal processors, baseband processors and other wireless communications circuits, power management units, audio chips, application specific integrated circuits, etc. During operation, control circuitry 20 may use display(s) 14 and other output devices in providing a user with visual output and other output.

To support communications between device 10 and external equipment, control circuitry 20 may communicate using communications circuitry 22. Circuitry 22 may include antennas, radio-frequency transceiver circuitry, and other wireless communications circuitry and/or wired communications circuitry. Circuitry 22, which may sometimes be referred to as control circuitry and/or control and communications circuitry, may support bidirectional wireless communications between device 10 and external equipment (e.g., a companion device such as a computer, cellular telephone, or other electronic device, an accessory such as a point device, computer stylus, or other input device, speakers or other output devices, etc.) over a wireless link. For example, circuitry 22 may include radio-frequency transceiver circuitry such as wireless local area network transceiver circuitry configured to support communications over a wireless local area network link, near-field communications transceiver circuitry configured to support communications over a near-field communications link, cellular telephone transceiver circuitry configured to support communications over a cellular telephone link, or transceiver circuitry configured to support communications over any other suitable wired or wireless communications link. Wireless communications may, for example, be supported over a Bluetooth® link, a WiFi® link, a wireless link operating at a frequency between 10 GHz and 400 GHz, a 60 GHz link, or other millimeter wave link, a cellular telephone link, or other wireless communications link. Device 10 may, if desired, include power circuits for transmitting and/or receiving wired and/or wireless power and may include batteries or other energy storage devices. For example, device 10 may include a coil and rectifier to receive wireless power that is provided to circuitry in device 10.

Device 10 may include input-output devices such as devices 24. Input-output devices 24 may be used in gathering user input, in gathering information on the environment surrounding the user, and/or in providing a user with output. Devices 24 may include one or more displays such as display(s) 14. Display(s) 14 may include one or more display devices such as organic light-emitting diode display panels (panels with organic light-emitting diode pixels formed on polymer substrates or silicon substrates that contain pixel control circuitry), liquid crystal display panels, microelectromechanical systems displays (e.g., two-dimensional mirror arrays or scanning mirror display devices), display panels having pixel arrays formed from crystalline semiconductor light-emitting diode dies (sometimes referred to as microLEDs), and/or other display devices.

Sensors 16 in input-output devices 24 may include force sensors (e.g., strain gauges, capacitive force sensors, resistive force sensors, etc.), audio sensors such as microphones, touch and/or proximity sensors such as capacitive sensors such as a touch sensor that forms a button, trackpad, or other input device), and other sensors. If desired, sensors 16 may include optical sensors such as optical sensors that emit and detect light, ultrasonic sensors, optical touch sensors, optical proximity sensors, and/or other touch sensors and/or proximity sensors, monochromatic and color ambient light sensors, image sensors, fingerprint sensors, iris scanning sensors, retinal scanning sensors, and other biometric sensors, temperature sensors, sensors for measuring three-dimensional non-contact gestures ("air gestures"), pressure sensors, sensors for detecting position, orientation, and/or motion (e.g., accelerometers, magnetic sensors such as compass sensors, gyroscopes, and/or inertial measurement units that contain some or all of these sensors), health sensors such as blood oxygen sensors, heart rate sensors, blood flow sensors, and/or other health sensors, radio-frequency sensors, depth sensors (e.g., structured light sensors and/or depth sensors based on stereo imaging devices that capture three-dimensional images), optical sensors such as self-mixing sensors and light detection and ranging (lidar) sensors that gather time-of-flight measurements, humidity sensors, moisture sensors, gaze tracking sensors, electromyography sensors to sense muscle activation, facial sensors, and/or other sensors. In some arrangements, device 10 may use sensors 16 and/or other input-output devices to gather user input. For example, buttons may be used to gather button press input, touch sensors overlapping displays can be used for gathering user touch screen input, touch pads may be used in gathering touch input, microphones may be used for gathering audio input, accelerometers may be used in monitoring when a finger contacts an input surface and may therefore be used to gather finger press input, etc.

If desired, electronic device 10 may include additional components (see, e.g., other devices 18 in input-output devices 24). The additional components may include haptic output devices, actuators for moving movable housing structures, audio output devices such as speakers, light-emitting diodes for status indicators, light sources such as light-emitting diodes that illuminate portions of a housing and/or display structure, other optical output devices, and/or other circuitry for gathering input and/or providing output. Device 10 may also include a battery or other energy storage device, connector ports for supporting wired communication with ancillary equipment and for receiving wired power, and other circuitry.

Figure 4:
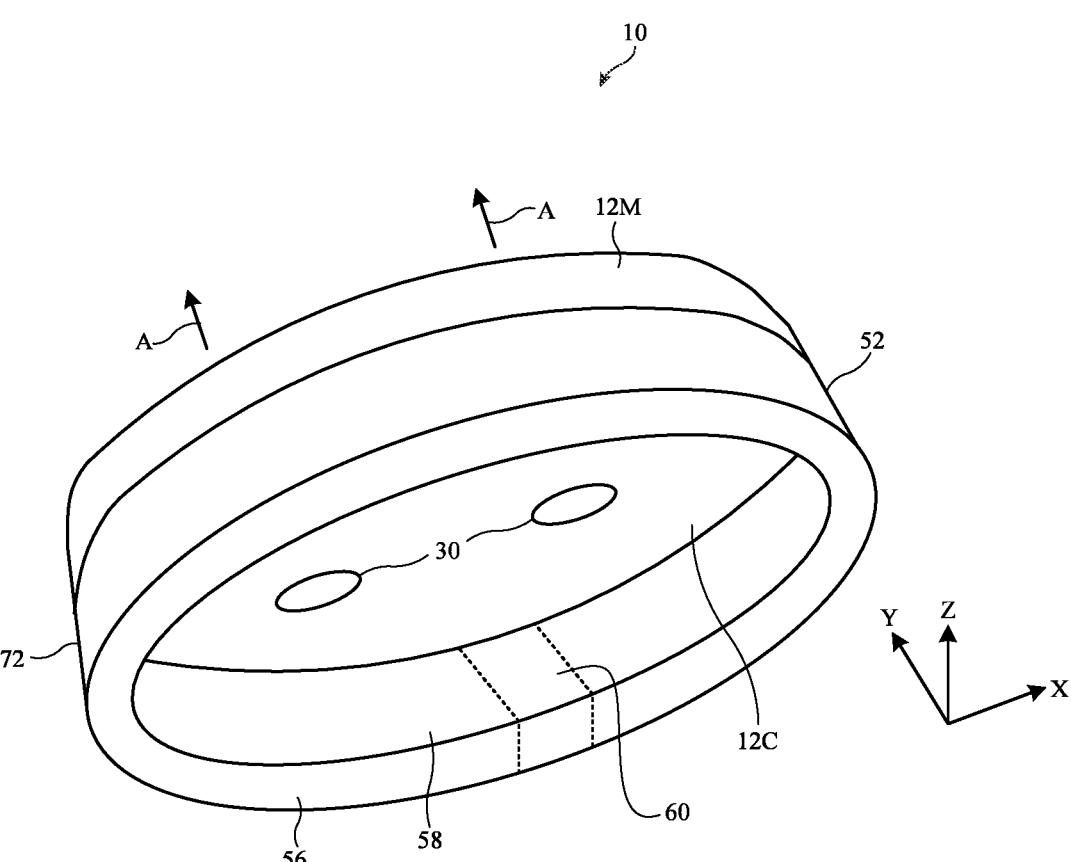
FIG. 4 is a perspective view of an illustrative head-mounted device having a fabric-covered face frame in accordance with an embodiment.

FIG. 4 is a perspective view of device 10 showing how a face frame may form a light seal around eye boxes 13 (FIG.

1) to help prevent outside light from leaking into the viewing area of head-mounted device 10. As shown in FIG. 4, device 10 may include main housing portion 12M which is configured to be mounted on a user's head. To help block outside light (e.g., ambient light in the user's environment that is not emitted by displays 14 of device 10) from entering the viewing area of head-mounted device 10 where eye boxes 13 are located, a light seal such as light seal 52 may be formed between main housing portion 12M and the user's face. For example, light seal 52 may extend between main housing portion 12M and temple housing portions 12T (FIG. 1) to help prevent light from entering any gaps between device 10 and the user's face.

Light seal 52 (sometimes referred to as face frame 52) may include one or more rigid structures such as a rigid internal frame member or other stiff structure and one or more flexible materials such as fabric, foam, polymer, or other suitable materials. For example, light seal 52 may include a ring-shaped or horseshoe-shaped frame that surrounds eye boxes 13 (FIG. 1) and that is covered by one or more layers of fabric. As shown in FIG. 4, light seal 52 may include one or more different fabric layers such as outer fabric layer 72, inner fabric layer 58, nose bridge fabric 60, and face fabric 56. Face fabric 56 may rest against the user's face when device 10 is worn on the user's head. Face fabric 56 may include one or more layers of foam covered in one or more layers of fabric (e.g., a warp knit fabric, a weft knit fabric, a spacer fabric, a woven fabric, and/or any other suitable fabric). Nose bridge fabric 60 may be formed from a stretchable textile to accommodate different nose shapes.

Outer fabric layer 72 may be a seamless tube of fabric that loops around the optical axes A of lenses 30 of optical modules 40. The optical axis A of each lens 30 extends parallel to the Y-direction of FIG. 4. Outer fabric layer 72 may form an outermost surface of device 10, if desired. Outer layer 72 may be formed from fabric such as knit fabric (e.g., warp knit fabric, weft knit fabric, etc.), woven fabric, spacer fabric (e.g., inner and outer knit layers separated by a gap and joined by a spacer layer such as a monofilament strand), braided fabric, and/or any other suitable fabric. In one illustrative arrangement, outer fabric layer 72 is a stretchable, seamless tube of weft knit fabric having a bird's eye pattern or other suitable two-color pattern (as an example). Arrangements in which outer layer 72 is formed from non-fabric materials such as polymer, silicone, or elastomer may also be used.

Inner fabric layer 58 may be a light-blocking fabric that lines the interior surface of outer fabric layer 72. Inner fabric layer 58 may include one or more layers of knit fabric, warp knit fabric, weft knit fabric, woven fabric, spacer fabric, braided fabric, and/or any other suitable type of fabric. It may be desirable to use dark-colored fabric for inner fabric layer 58 to help keep the viewing area around eye boxes 13 sufficiently dark while the user is viewing images on displays 14 of device 10. If care is not taken, however, the dark color of inner fabric layer 58 may be visible through outer fabric layer 72. If outer fabric layer 72 is a light color such as white or gray and inner fabric layer 58 is a dark color such as black, for example, the black color of inner fabric layer 58 may be visible through openings or gaps between strands in outer fabric layer 72, which may be visually distracting. If inner fabric layer 58 is instead made from a light-colored fabric such as white or gray, inner fabric layer 58 may not be as visible through outer fabric layer 72, but the opacity of inner fabric layer 58 may be reduced, which can lead to an unsatisfactory viewing experience if care is not taken.

To prevent inner fabric layer 58 from being overly visible through outer fabric layer 72 without compromising opacity, inner fabric layer 58 may include one or more dark-colored inner fabric layers on the viewing side (e.g., facing eye boxes 13 and lenses 30 of optical modules 40) and one or more light-colored outer fabric layers on the non-viewing side (e.g., facing outer fabric layer 72). The dark-colored inner fabric layer of inner fabric layer 58 may be black, dark gray, or other suitable dark color, whereas the light-colored outer fabric layer of inner fabric layer 58 may be white, gray, light gray, cream, off-white, or other suitable light color. The dark inner layer and light outer layer of inner fabric layer 58 may be weft knit layers that are coupled by a middle spacer layer, if desired. For example, a spacer layer formed from a multifilament or monofilament strand may be used to join the dark inner layer and light outer layer of inner fabric layer 58. The spacer layer may be a drawn textured yarn with a low denier value such as 20D or other suitable denier value to ensure that the spacer layer has sufficient density to block outside light from entering the viewing area. If desired, strands that make up inner fabric layer 58 may be extruded, solution-dyed strands with high texture and high stretch, thereby increasing the shrinkage and opacity of inner fabric layer 58.

Figure 5:
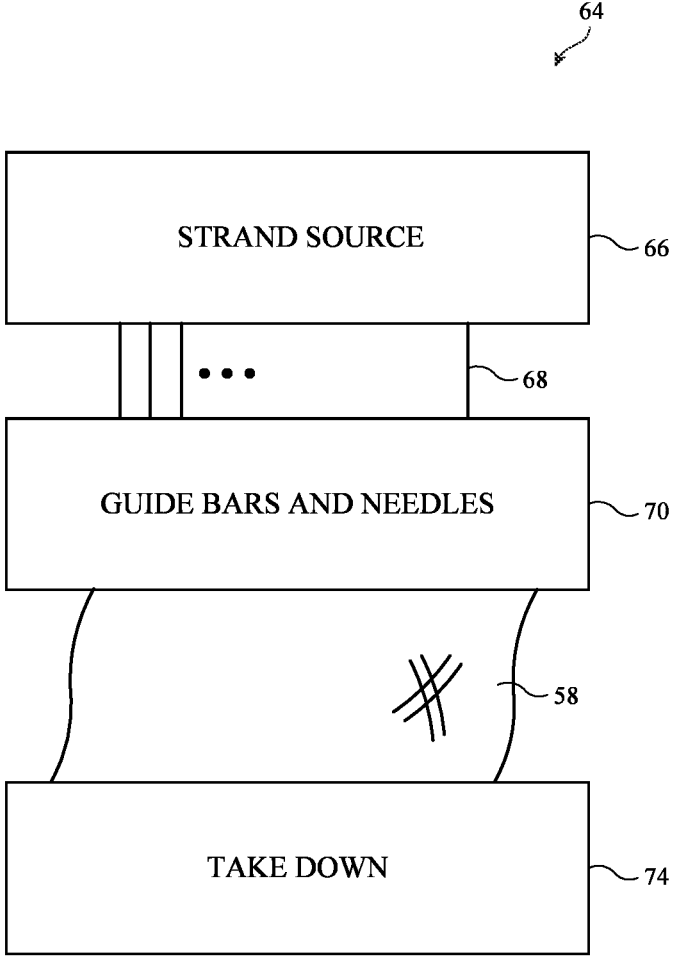
FIG. 5 is a schematic diagram of an illustrative knitting system in accordance with an embodiment.

A knitting machine or other equipment may be used in forming fabric for device 10 such as inner fabric layer 58. FIG. 5 is a schematic diagram of an illustrative knitting system. As shown in FIG. 5, strand source 66 in knitting system 64 may be used in supplying strands 68 to guide and needle structures 70. Structures 70 may include strand guide structures (e.g., a system of movable guide bars with eyelets that guide strands 68) and needle systems (e.g., needle guide systems that guide sets of individually adjustable needles so that the needles may interact with the strands dispensed by the guide bars). During operations, a controller may control electrically adjustable positioners in system 64 to manipulate the positions of guide bars and needles in system 64 and thereby knit strands 68 into fabric 58. Take down 74 (e.g., a pair of mating rollers or other equipment forming a take down system) may be used to gather fabric 58 that is produced during knitting.

Figure 6:
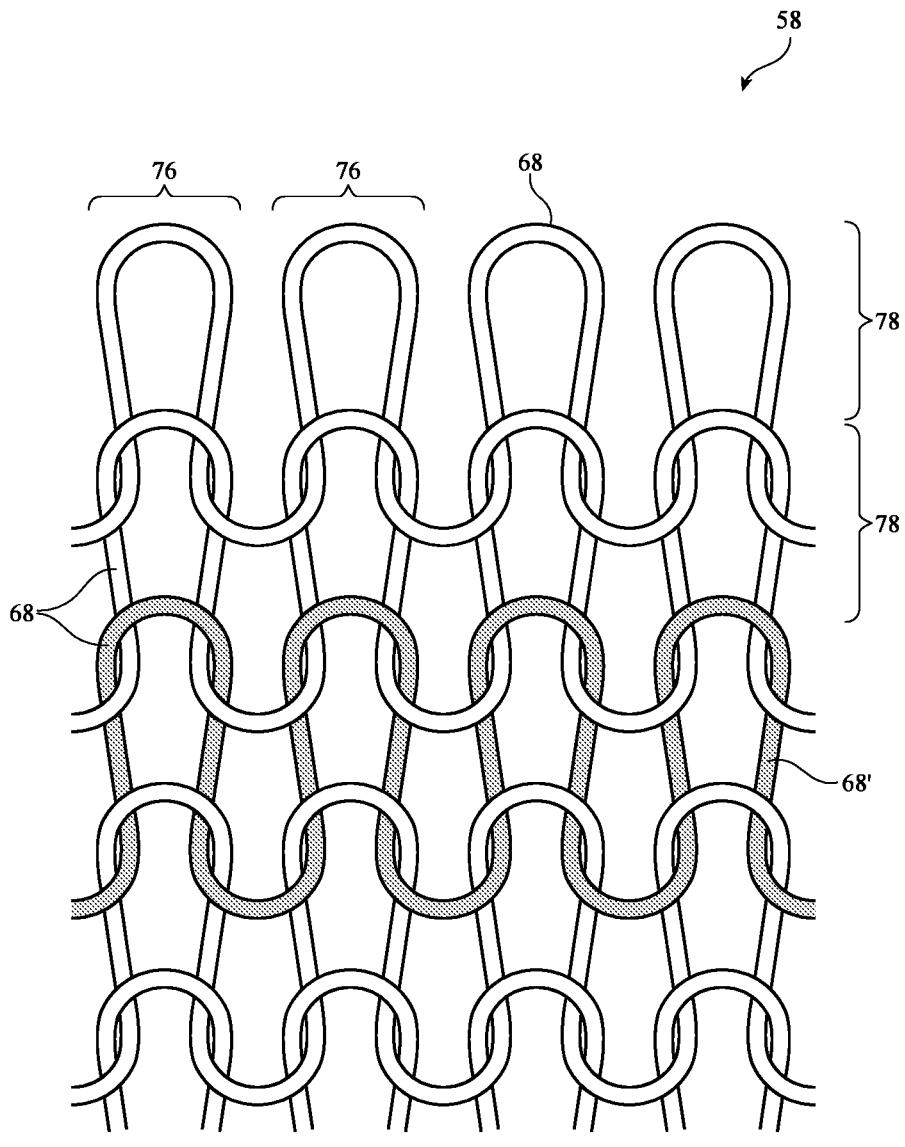
FIG. 6 is a diagram of a portion of an illustrative weft knit fabric layer in accordance with an embodiment.

FIG. 6 is a diagram of an illustrative layer of weft knit fabric that may be included in inner fabric layer 58. Knit fabric such as fabric 58 may be made up of courses 78 (e.g., rows of loops formed by strands 68) and wales 76 (e.g., columns of loops formed by strands 68). In a weft knit fabric of the type shown in FIG. 6 (sometimes referred to as a flat knit fabric), strands 68 form loops that extend horizontally across the fabric. An illustrative strand 68' among strands 68 has been highlighted to show the horizontal path taken by each strand 68 in fabric 72. In contrast, a warp knit fabric includes wales 76 formed from strands 68 that follow zig-zag paths vertically down the fabric.

Figure 7:
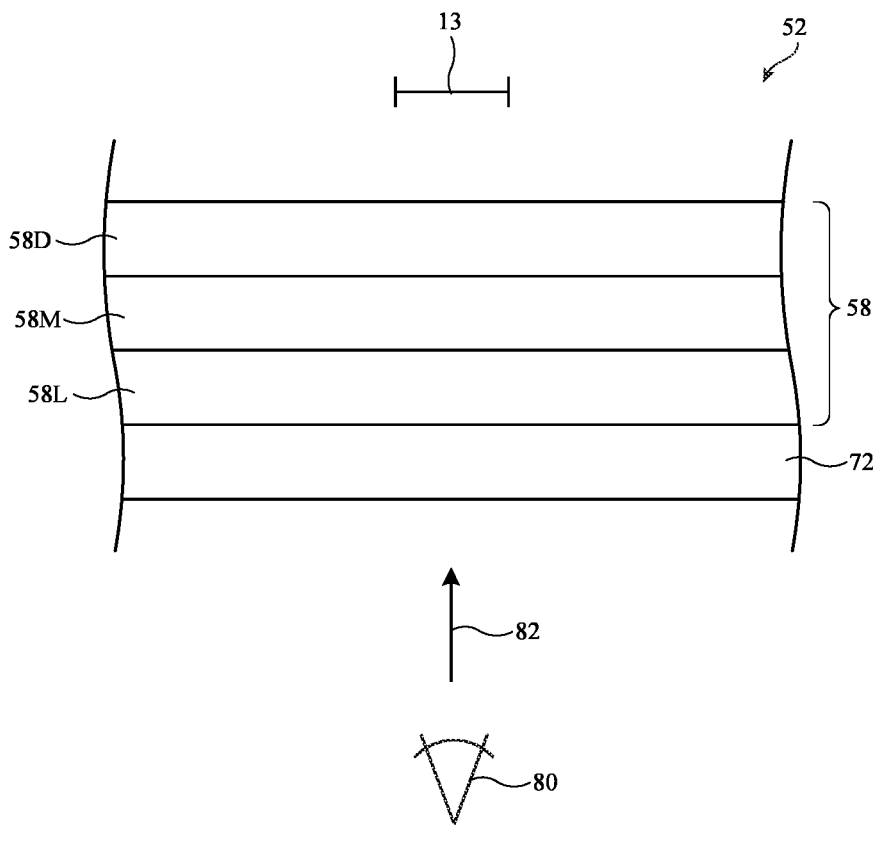
FIG. 7 is a cross-sectional side view of an illustrative light seal having an outer fabric layer with a first color and an inner fabric layer formed from a first layer that matches the first color and a second layer that faces the eye box and has a dark color in accordance with an embodiment.

A cross-sectional side view of an illustrative portion of light seal 52 of device 10 is illustrated in FIG. 7. As shown in FIG. 7, light seal 52 may include inner fabric layer 58 and outer fabric layer 72. Outer fabric layer 72 may form an outermost surface of light seal 52 and may be viewed in direction 82 by an outside viewer such as viewer 80. Inner fabric layer 58 may line the inner surface of outer fabric layer 72 and may face towards eye boxes such as eye box 13. When device 10 is placed on a user's head, the user's eyes may be located in eye boxes such as eye box 13.

Inner fabric layer 58 may have inner and outer fabric layers such as light-colored outer fabric layer 58L and dark-colored inner fabric layer 58D coupled by a spacer layer such as spacer layer 58M. Light-colored outer fabric layer 58L may be white, off-white, cream, gray, light gray, or other suitable light color. Light-colored outer fabric layer 58L may, for example, match a color of outer fabric layer 72. Dark-colored inner fabric layer 58D may be black, dark gray, dark blue, or other suitable dark color. Dark-colored inner fabric layer 58D and light-colored outer fabric layer 58L may be weft knit layers (e.g., of the type shown in FIG. 6), and may be formed from strands 68 (e.g., drawn textured yarns) having a denier value of 40D (or two-ply 20D strands) or other suitable denier value.

Spacer layer 58M (sometimes referred to as middle layer 58M) may be formed from one or more multifilament strands 68 with a low denier value such as 20D, 25D, or other suitable denier value. Spacer layer 58M may be formed from black strands, white strands, gray strands, or strands of any other suitable color. By selecting strands 68 for spacer layer 58M that have half the denier value of strands 68 of light-colored inner fabric layer 58L and dark-colored fabric layer 58D, fabric 58 may appear truly white (or other suitable light color) when viewed in direction 82) and may appear truly black (or other suitable dark color) when viewed from eye box 13), regardless of the color of spacer layer 58M.

Strands in light-colored inner fabric layer 58L, dark-colored outer fabric layer 58D, and spacer layer 58M may be formed from materials such as nylon, polyester, elastic material such as spandex, or other suitable materials. In general, nylon is bulkier than polyester due to less intermingling points and intermingling intensity among individual filaments. If polyester strands are used, the polyester may be modified to reduce intermingling between filaments such that the filaments in each polyester strand spread out more and thus block more light.

Inner fabric layer 58 may be formed using a circular knitting machine. The circular knitting machine may have a high gauge such as 80 gauge or other suitable gauge to ensure a higher number of strands per inch in the fabric. The higher number of strands per inch in fabric 58, the higher the opacity will be. For example, fabric 58 may have more than 80 strands per inch, more than 90 strands per inch, more than 100 strands per inch, less than 100 strands per inch, or other suitable density of strands 68. Additionally, fabric 58 may include stretchable strands (e.g., strands formed from spandex or other elastic material) to add shrinkage to fabric 58 and further increase the opacity of light seal 52. Fabric 58 may be heat set at a low heat setting (or not heat set at all) to help maintain opacity and stretch.

Figure 8:
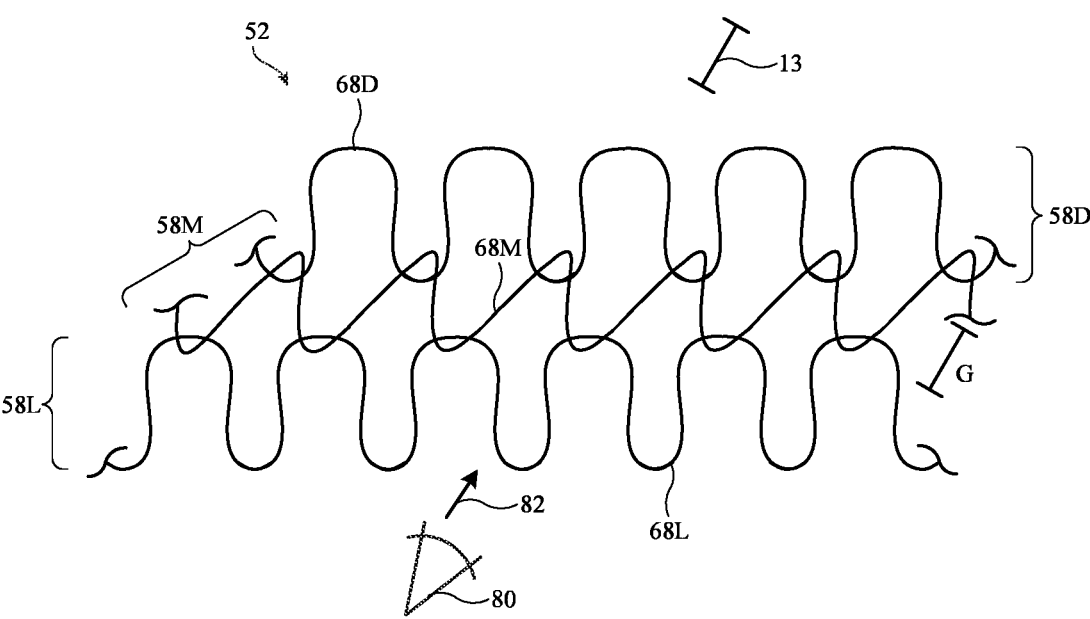
FIG. 8 is a perspective view of an illustrative inner fabric layer for a light seal having a dark-colored inner layer and a light-colored outer layer joined by a middle layer in accordance with an embodiment.

FIG. 8 is a perspective view of inner fabric layer 58. As shown in FIG. 8, inner fabric layer 58 may include dark-colored inner fabric layer 58D facing eye box 13 and light-colored outer fabric layer 58L facing outside viewers such as viewer 80 viewing light seal 52 in direction 82. Spacer layer 58M may include one or more multifilament strands such as multifilament strand 68M coupled between dark-colored inner fabric layer 58D and light-colored outer fabric layer 58L. Spacer layer 58M may be a low denier yarn (e.g., 20D, 25D, or other suitable denier value) to increase fabric density and minimize the gap G between dark-colored inner fabric layer 58D and light-colored outer fabric layer 58L.

Strands 68D of dark-colored inner fabric layer 58D and strands 68L of light-colored outer fabric layer 58L may have twice the denier value of spacer strand 68M (e.g., strands 68M may have a denier value of 20D, whereas strands 68D and 68L may have a denier value of 40D or may be two-ply strands with each ply having a denier value of 20D) such that fabric 58 appears truly white (or other light color) when viewed in direction 82 by viewer 80 and truly black (or other dark color) when viewed from eye box 13. In general, strands 68L, 68D, and 68M may be formed from any suitable material, such as nylon, polyester, spandex or other elastic material, etc. If desired, strands 68D and 68L may be two-ply strands that each include an elastic strand having a denier value of 20D and a polyester strand having a denier value of 20D.

Figure 9:
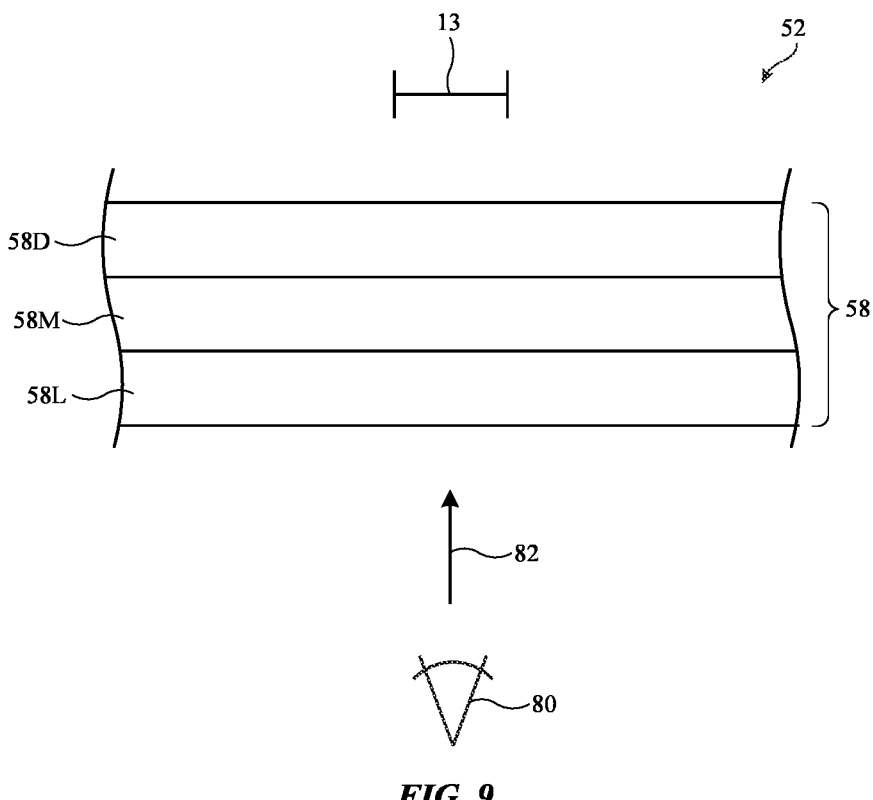
FIG. 9 is a cross-sectional side view of an illustrative light seal having a light-colored outer fabric layer that forms an outermost layer of the light seal and a dark-colored inner fabric layer that faces the eye box in accordance with an embodiment.

FIG. 9 is a cross-sectional side view of light seal 52 in an illustrative configuration in which outer fabric layer 72 has been omitted. With this type of arrangement, light-colored outer fabric layer 58L may form the outermost surface of light seal 52 and may be viewed directly by viewer 80 in direction 82. Due to the presence of middle layer 58M, dark-colored fabric 58D may not be viewable through light-colored outer fabric layer 58L. In other words, fabric layer 58 may appear truly white (or other light color) when viewed in direction 82 and truly black (or other dark color) when viewed from eye box 13.

As described above, one aspect of the present technology is the gathering and use of information such as information from input-output devices. The present disclosure contemplates that in some instances, data may be gathered that includes personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, username, password, biometric information, or any other identifying or personal information.

The present disclosure recognizes that the use of such personal information, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide certain types of user data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of information that may include personal information data to implement one or more various disclosed embodiments, the present disclosure also contemplates that the various embodiments can also be implemented without the need for accessing personal information data. That is, the various embodiments of the present technology are not rendered inoperable due to the lack of all or a portion of such personal information data.

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Computer-generated reality: in contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands). A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects. Examples of CGR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground. Examples of mixed realities include augmented reality and augmented virtuality. Augmented reality: an augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof. Augmented virtuality: an augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Hardware: there are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, μLEDs, liquid crystal on silicon, laser scanning light sources, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

The foregoing is merely illustrative and various modifications can be made to the described embodiments. The foregoing embodiments may be implemented individually or in any combination.

What is claimed is:

1. A head-mounted device, comprising:
a main housing unit having a display that presents images and an optical module through which the images are viewable from an eye box; and
a light seal coupled to the main housing unit and surrounding the eye box, wherein the light seal comprises:
an outer fabric layer that forms an outermost surface of the light seal; and
a light-blocking inner fabric layer that lines an inner surface of the outer fabric layer, wherein the light-blocking inner fabric layer comprises a dark-colored knit layer facing the eye box, a light-colored knit layer facing the outer fabric layer, and a spacer layer joining the dark-colored knit layer and the light-colored knit layer.

2. The head-mounted device defined in claim 1 wherein the light-colored knit layer matches a color of the outer fabric layer and wherein the dark-colored knit layer is not visible through the outer fabric layer.

3. The head-mounted device defined in claim 1 wherein the spacer layer matches a color of the light-colored knit layer.

4. The head-mounted device defined in claim 1 wherein the spacer layer matches a color of the dark-colored knit layer.

5. The head-mounted device defined in claim 1 wherein the light-colored knit layer comprises first strands having a first denier value and the spacer layer comprises second strands having a second denier value that is half the first denier value.

6. The head-mounted device defined in claim 1 wherein the dark-colored knit layer comprises first strands having a first denier value and the spacer layer comprises second strands having a second denier value that is half the first denier value.

7. The head-mounted device defined in claim 1 wherein the dark-colored knit layer and the light-colored knit layer each comprise a weft knit layer.

8. The head-mounted device defined in claim 1 wherein the light-blocking inner fabric layer has a density of at least 80 strands per inch.

9. The head-mounted device defined in claim 1 wherein the light-colored knit layer and the dark-colored knit layer comprise two-ply strands.

10. The head-mounted device defined in claim 9 wherein each two-ply strand includes a polyester strand and an elastic strand.

11. A head-mounted device, comprising:
head-mounted support structure;
a display supported by the head-mounted support structure, wherein the display presents images that are viewable from an eye box; and a light seal coupled to the head-mounted support structure and configured to block outside light from reaching the eye box, wherein the light seal comprises:
a seamless tube of knit fabric having a first color; and
a light-blocking knit fabric that lines an inner surface of the seamless tube of knit fabric, wherein the light-blocking knit fabric has a first fabric layer with the first color, a second fabric layer with a second color that is darker than the first color, and a middle layer that joins the first and second layers, wherein the first layer is interposed between the second layer and the seamless tube of knit fabric.

12. The head-mounted device defined in claim 11 wherein the seamless tube of knit fabric, the first fabric layer, and the second fabric layer comprise weft knit fabric.

13. The head-mounted device defined in claim 11 wherein the first fabric layer comprises first strands and the second fabric layer comprises second strands and wherein the first strands and the second strands have equal denier values.

14. The head-mounted device defined in claim 13 wherein the middle layer comprises third strands having a denier value that is half the denier value of the first strands and the second strands.

15. The head-mounted device defined in claim 14 wherein the first strands and the second strands comprise two-ply strands that each include a polyester strand and an elastic strand.

16. A head-mounted device, comprising:
a head-mounted housing;
a display in the head-mounted housing that presents images;
a lens in the head-mounted housing through which the images are viewable from an eye box; and
a light seal that extends around the eye box and that is coupled to the head-mounted housing, wherein the light seal comprises:
a light-colored weft knit layer;
a dark-colored weft knit layer; and
a middle layer joining the light-colored weft knit layer and the dark-colored weft knit layer, wherein the light-colored weft knit layer has first and second opposing sides and wherein the dark-colored weft knit layer is located on the first side facing the eye box and is not viewable from the second side.

17. The head-mounted device defined in claim 16 wherein the light-colored weft knit layer and the dark-colored weft knit layer comprise first strands having a first denier value and wherein the middle layer comprises second strands having a second denier value that is half the first denier value.

18. The head-mounted device defined in claim 17 wherein the first strands comprise two-ply strands that each include a polyester strand and an elastic strand.

19. The head-mounted device defined in claim 16 wherein the light seal further comprises a seamless tube of weft knit fabric that forms an outermost surface of the light seal and wherein the seamless tube of weft knit fabric matches a color of the light-colored weft knit layer.

20. The head-mounted device defined in claim 16 wherein the middle layer comprises a multifilament strand that is interlaced with the light-colored weft knit layer and the dark-colored weft knit layer.

* * * * *